United States Patent Office 3,010,839
Patented Nov. 28, 1961

3,010,839
METHOD OF MAKING SILICON MONOXIDE ARTICLES
Carl E. Drumheller, Bay Village, Peter T. Marth, Cleveland, and Johann S. Wagener, Lakewood, Ohio, assignors to Union Carbide Corporation, a corporation of New York
No Drawing. Filed July 1, 1959, Ser. No. 824,167
4 Claims. (Cl. 106—286)

This invention relates to the production of silicon monoxide articles and it more particularly relates to the production of hard, durable silicon monoxide pellets for use in silicon monoxide evaporators.

Silicon monoxide is a relatively new material insofar as the commercial world is concerned. It has recently been discovered that this material is particularly well suited to use as a protective coating on optical and electronic parts. The conventional method of coating this material onto the parts to be protected is to evaporate it from some source and thus vapor plate the part with the protective coating. There is a novel evaporation device particularly adapted to the vaporization of silicon monoxide in the pellet form, disclosed in copending application Serial Number 824,396, filed July 1, 1959, which renders this material readily vaporizable in any desired direction with optimum efficiency. In perfecting this device, it was found that silicon monoxide could not efficiently be used in the forms readily available from commercial producers, for example powder or irregular chunks. It was found that it would be much more expedient to form the silicon monoxide into pellets, tablets or some other article having predetermined and reproducible size, shape, density and other physical properties.

It is therefore the principal object of this invention to provide articles comprising silicon monoxide which are hard, durable and have predetermined, reproducible properties.

It is another object of this invention to provide a novel method of manufacturing such articles.

In accord with and fulfilling these objects, this invention comprises mixing particulate silicon monoxide with a colloidal siliceous solution; compressing this mixture into the desired shape; and baking the shape at an elevated temperature in the presence of an oxygen-containing atmosphere. For the purposes of this specification and the claims appended hereto, the term siliceous is hereby defined as including silica and silicic acids but excluding those salts of silicic acid containing metallic cations.

It is necessary to the practice of this invention that a siliceous material be used as a binder since silicon monoxide does not sinter at high temperatures nor are purely organic or carbonaceous binders adequate since they either introduce impurities into the mix or do not retain sufficient bonding properties at the sublimation temperature of silicon monoxide to form effective bonds. The selection of the proper bonding agent, within the terms herein specified, is a critical feature of this invention.

Good articles have been made according to this invention using ratios of silicon monoxide to siliceous material ranging from 4 to 1 to 20 to 1. It is preferred however to keep this ratio as close to 4 as possible since the best articles were made using the lowest ratio of silicon monoxide to siliceous material. Similarly, good articles have been made at pressures ranging from about 4000 pounds per square inch to about 120,000 pounds per square inch. Here, as in the case of the ratio of silicon monoxide to siliceous material, it is expedient to use relatively low pressures up to about 20,000 pounds per square inch particularly in view of the increased cost of production as the pressure utilized is increased. Baking temperatures from 100° C. to 1400° C. have been successfully used. The preferred temperature range however is from 400° C. to 900° C. Still another variable in the method of this invention is the baking time. This may vary from 10 to 150 minutes and still serve the purpose of this invention. In the case of each of the variables, baking time, molding pressure, and baking temperature, the particular combination of conditions will be dictated by the economies of production. It is desirable to use the shortest time, and lowest temperature and pressure for a given ratio of binder to silicon monoxide and still manufacture an article suitable for the use intended.

Satisfactory articles have been fabricated from silicon monoxide in particle sizes as coarse as 60 mesh (U. S. Standard screen) and as fine as though 325 mesh (U.S. Standard screen). Mixtures of various particle size silicon monoxide have also been successfully utilized to make suitable articles. Here too, the amount of binder and molding pressure, and the time and temperature of baking will vary depending upon the size particles used, the size of the finished article being fabricated, and the density and hardness desired in the finished article.

It is of great importance in the practice of this invention that the baking step be carried out in an oxygen-containing atmosphere. In keeping with the desire to affect as many economies in the manufacture of articles according to this invention as possible, air is preferred as the oxygen containing atmosphere. Mixtures of inert gases and oxygen, as well as other oxygenated atmospheres are, however, well within the scope of the invention.

The following may be cited as specific examples of the practice of this invention.

*Example I*

Finely-divided silicon monoxide, in particle sizes, such that all passed through a 200 mesh screen but was retained on a 325 mesh screen, was mixed with a 35 percent aqueous solution of colloidal silica in a weight proportion of 4 parts silicon monoxide to 1 part solution. The mixture was molded at 20,000 pounds per square inch pressure and then baked for 15 minutes at 400° C. in an oxygen atmosphere.

*Example II*

Finely-divided silicon monoxide, in particle sizes, such that all passed through a 60 mesh screen but was retained on a 200 mesh screen, was mixed with a 35 percent aqueous solution of colloidal silica in a weight ratio of 20 parts silicon monoxide to 1 part solution. The mixture was molded at 15,000 pounds per square inch pressure and baked for 10 minutes at 800° C. in an air atmosphere.

*Example III*

Finely-divided silicon monoxide, in particle sizes such that all passed through a 120 mesh screen but was retained on a 325 mesh screen, as mixed with a 35 percent aqueous solution of colloidal silica in a weight ratio of 4 parts silicon monoxide to 1 part solution. The mixture was molded at 20,000 pounds per square inch pressure and baked for 15 minutes at 850° C. in an air atmosphere.

The articles described in the above examples had various dimensions depending upon the end use to which each was to be put. These articles had diameters of ½, ⅜ or ¼ inch and lengths of $\frac{5}{32}$, ¼ or $\frac{11}{32}$ inch and each article had a 40 mil aperture coincident with its axis. All the pellets described above were of uniform purity and each batch of specific dimensions and particular formulation were uniform in weight and size. Each pellet was also hard, strong, and well able to withstand all normal factory handling and shipping without damage to the pellets or loss of weight due to chipping or powdering.

What is claimed is:

1. The method of producing a hard and durable silicon monoxide article which comprises mixing silicon monoxide of a particle size less than 60 mesh (U.S. Standard screen) with a 35 percent solution of colloidal silica said silicon monoxide being in a portion between 20:1 and 4:1, with respect to said colloidal silica; compressing said mix at 4000 to 120,000 pounds per square inch pressure; and baking the resulting shape at 100° C. to 1400° C. for about 10 to about 150 minutes in an oxygen-containing atmosphere.

2. The method of producing a hard and durable silicon monoxide article which comprises mixing silicon monoxide particles of between 120 and 325 mesh size (U.S. Standard screen) with a 35 percent solution of colloidal silica said silicon monoxide being in a proportion between 20 to 1 and 4 to 1 with respect to said silica; compressing said mix into the desired shape at about 20,000 pounds per square inch pressure; and baking the resulting shape at about 850° C. for about 10 to about 15 minutes in an oxygen-containing atmosphere.

3. The method of producing a hard and durable silicon monoxide article which comprises mixing silicon monoxide particles with colloidal silica solution in a proportion of at least 4 parts by weight silicon monoxide to 1 part by weight colloidal silica solution; compressing said mix with about 4000 pounds per square inch up to about 120,000 pounds per square inch pressure into the desired shape; and baking the resultant article in an oxygen-containing atmosphere at an elevated temperature of about 100° C. to about 1400° C. for about 15 minutes.

4. An article adapted to be sublimed consisting of silicon monoxide bonded by silica, said article being the result of mixing silicon monoxide of a particle size less than 60 mesh (U.S. Standard screen) with a 35 percent solution of colloidal silica in a proportion between about 20 to 1 and about 4 to 1 respectively; compressing said mix at about 4000 p.s.i. to about 120,000 p.s.i.; and baking said compressed mix at about 100° C. to about 140° C. for between about 10 minutes and about 150 minutes in an oxygen-containing atmosphere.

References Cited in the file of this patent

UNITED STATES PATENTS

| | | |
|---|---|---|
| 2,380,945 | Collins | Aug. 7, 1945 |
| 2,705,206 | Wagner | Mar. 29, 1955 |
| 2,801,902 | Alexander et al. | Aug. 6, 1957 |
| 2,882,177 | Newton et al. | Apr. 14, 1959 |